United States Patent [19]

Gust

[11] 4,445,314

[45] May 1, 1984

[54] SUNFLOWER HEADER ATTACHMENT

[75] Inventor: Jacob N. Gust, West Fargo, N. Dak.

[73] Assignee: Concord, Inc., Fargo, N. Dak.

[21] Appl. No.: 351,292

[22] Filed: Feb. 22, 1982

[51] Int. Cl.³ .......................................... A01D 45/00
[52] U.S. Cl. ...................................... 56/126; 56/119; 56/130; 56/14.4; 56/222
[58] Field of Search ...................... 56/17.3, 55, 65, 94, 56/96, 119, 126–130, 219–222, 226, 14.3, 14.4, 97, 207, 208, 214, DIG. 15, 98

[56] References Cited

U.S. PATENT DOCUMENTS

| 49,963 | 9/1865 | Batty . | |
|---|---|---|---|
| 153,258 | 7/1874 | Jamison . | |
| 225,854 | 3/1880 | Moore | 56/220 |
| 275,649 | 4/1883 | Hebron | 56/221 |
| 762,168 | 6/1904 | Heydrick . | |
| 1,071,554 | 8/1913 | Jackson | 56/219 |
| 1,379,112 | 5/1921 | Luedke | 56/126 |
| 1,604,458 | 10/1926 | Luedke | 56/126 |
| 1,900,806 | 3/1933 | Evenson | 56/119 |
| 2,575,120 | 11/1951 | Peel | 56/126 |
| 2,639,569 | 5/1953 | Pasturczak | 56/DIG. 15 |
| 2,765,612 | 10/1956 | Raumaker et al. | 56/97 |
| 2,867,961 | 1/1959 | Heilbrun | 56/119 |
| 3,392,514 | 7/1968 | McEachern et al. | 56/98 |
| 3,766,723 | 10/1973 | Maier et al. | 56/13.3 |
| 3,812,661 | 5/1974 | Baker | 56/97 |
| 3,844,094 | 10/1974 | Janzen | 56/126 |
| 3,995,412 | 12/1976 | Gaeddert et al. | 56/98 |
| 3,995,413 | 12/1976 | Lynch | 56/96 |
| 4,069,650 | 1/1978 | Montanari | 56/221 |
| 4,204,385 | 5/1980 | Taylor | 56/119 |
| 4,255,920 | 3/1981 | Janzen | 56/126 |

OTHER PUBLICATIONS

"Combine Harvester," *The Illustrated Science & Invention Encyclopedia*, vol. 5, pp. 611–614, H. S. Stuttman Co., Inc. (Publishers) (1977).

"Stover Head," *Fundamentals of Machine Operation, Hay and Forage Harvesting*, A. Rider and S. Barr, pp. 9, 244, Deere & Co., Moline, Ill. (1976).

Primary Examiner—John J. Wilson
Assistant Examiner—John G. Weiss
Attorney, Agent, or Firm—Kinney & Lange

[57] ABSTRACT

An apparatus for increasing the efficiency of sunflower harvesting by combine consists of a sunflower header attachment secured over a reciprocating sickle bar assembly at the front end of the combine. A plurality of spaced apart pans are secured over the sickle bar assembly to extend forwardly from the combine. Pivotally mounted at the forward end of each pan is an elongated snout tapered to a rounded tip at its front end. The snouts have smooth sides and rounded edges to allow the combine to gently engage sunflower stalks during the harvesting operation. A reel is rotatably mounted transversely over the pans and is driven to rotate on a generally horizontal axis for urging sunflowers into the combine. Preferably, the reel has only two wings, the axes of which are substantially coplanar, so that in operation the reel does not prevent a combine operator from observing a significant degree of the sunflower gathering and cutting operations. Each wing has a rounded outer edge and is completely covered having smooth rounded sides to gently guide sunflowers into the combine and minimize seed loss.

2 Claims, 11 Drawing Figures

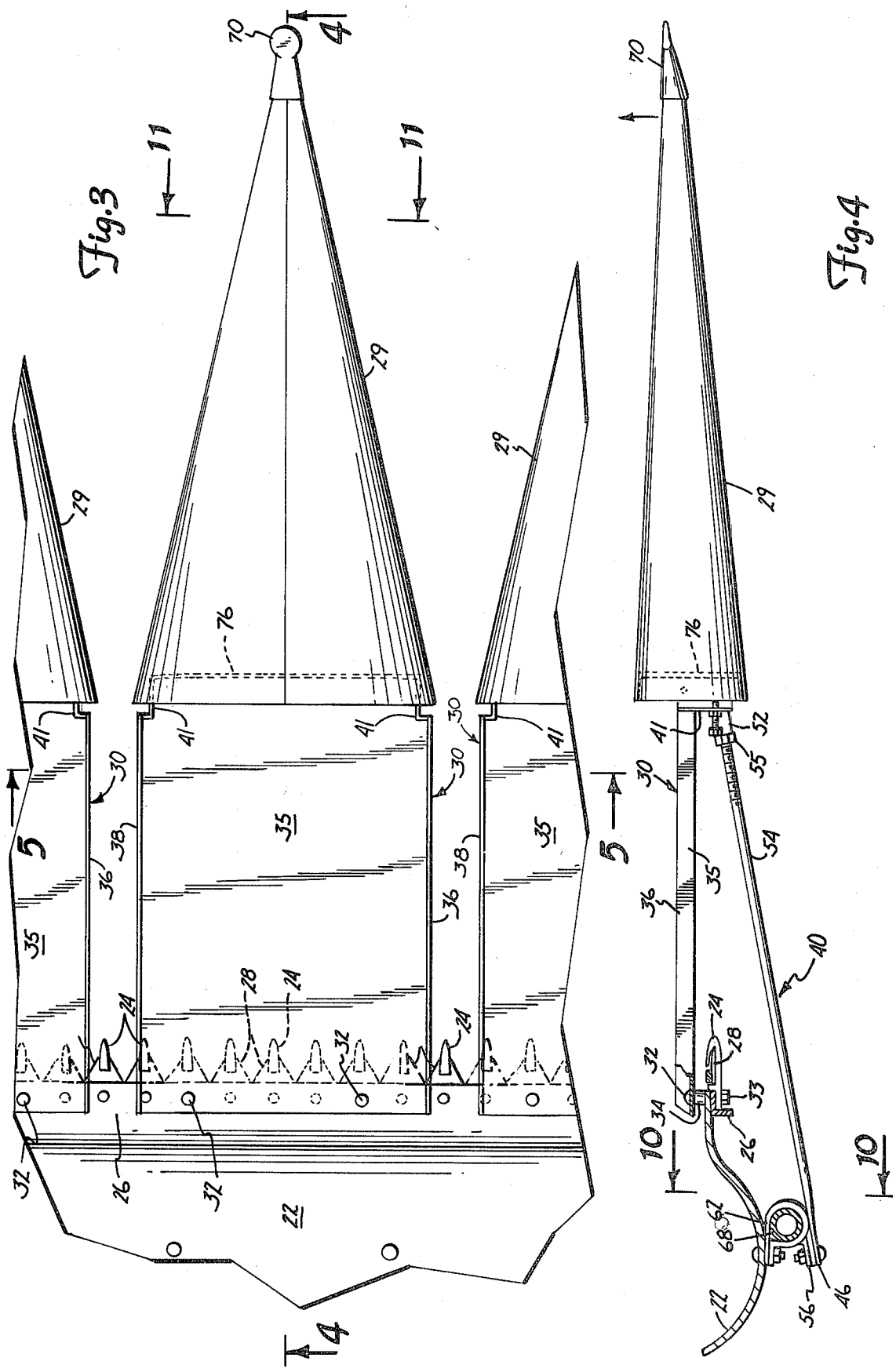

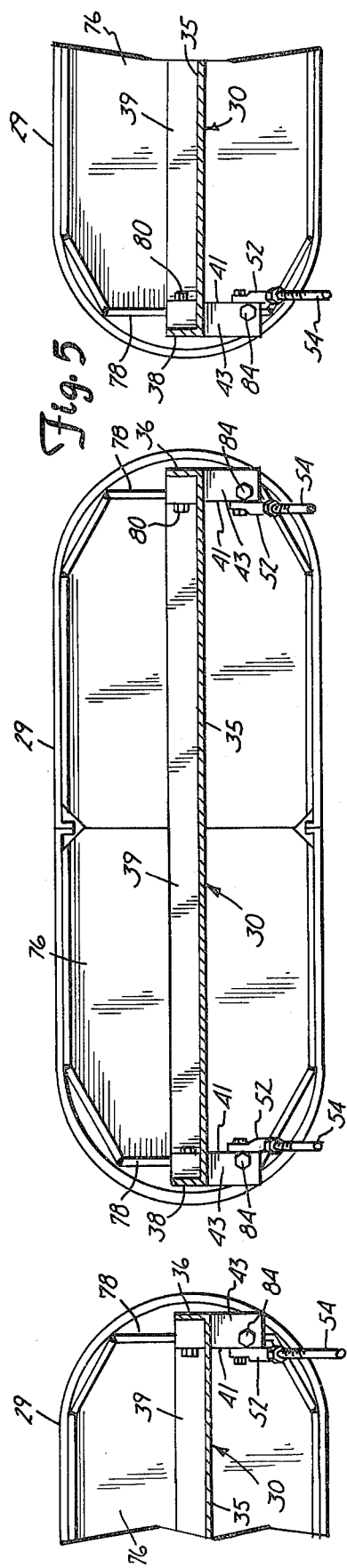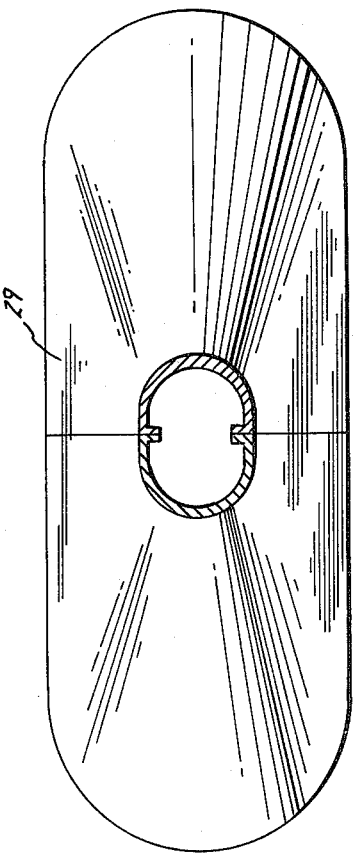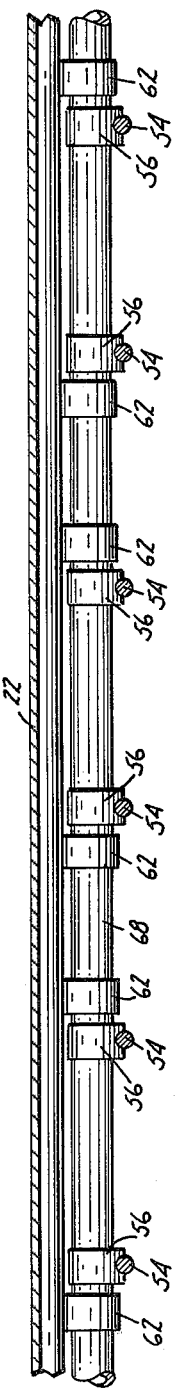

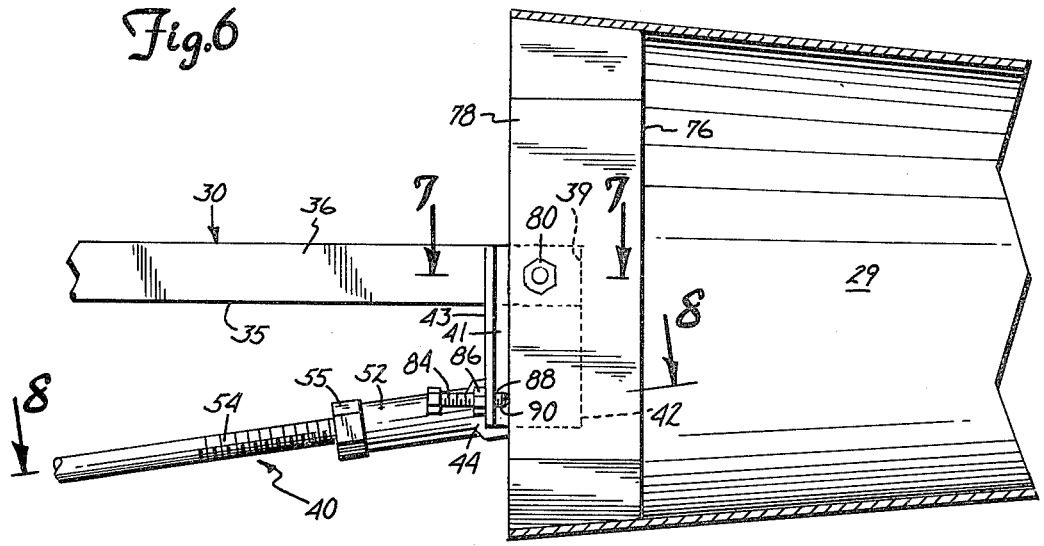
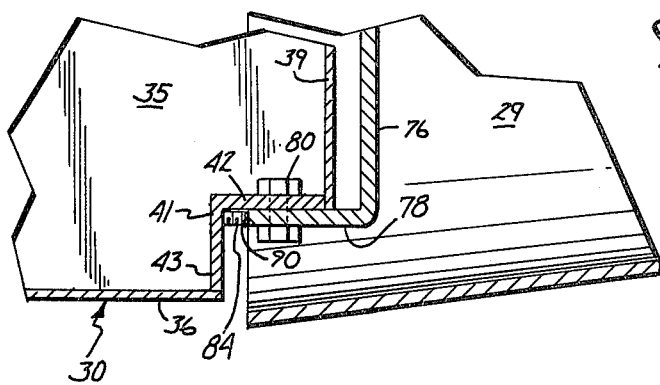
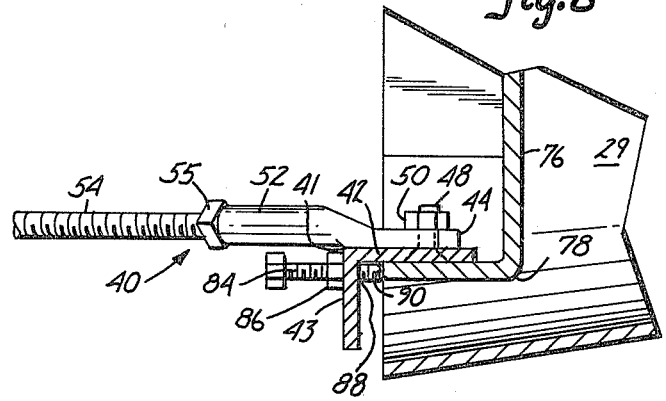
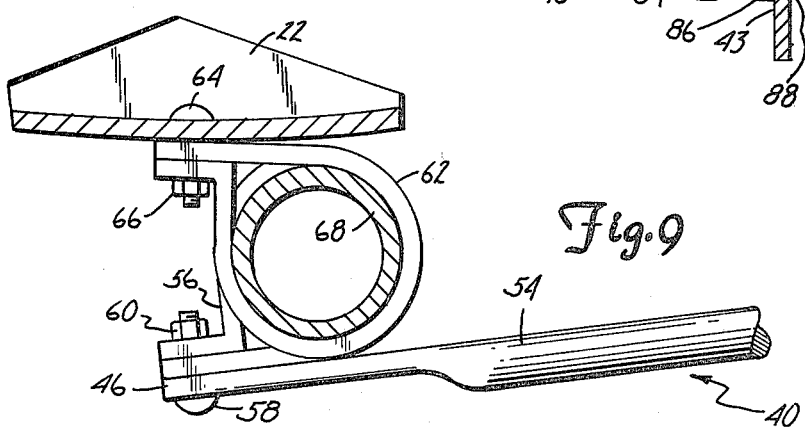

SUNFLOWER HEADER ATTACHMENT

BACKGROUND OF THE INVENTION

1. Field of the Invention

The present invention relates to sunflower harvesters, and specifically to a sunflower header attachment for improving the efficiency of the harvesting operation.

2. Description of the Prior Art

Standard sunflower header attachments for combines are quite inefficient when used to harvest sunflower crops. Sharp edges and short snouts cause stalk breakage and seed loss because sunflower stalks and heads are not allowed to gently enter the combine. In addition, if a stalk is broken so that the sunflower head containing the seed lies on the ground, combine headers are unable to pick up the seed carrying head and guide it into the combine without substantial seed loss. The many moving parts in such combines are also highly susceptible to jamming and clogging with sunflower parts.

Illustrative of the prior harvesting devices inappropriate for sunflower harvesting are the inventions described in U.S. Pat. Nos. 49,963, 153,258, 275,649, and 762,168. The first and oldest patent (U.S. Pat. No. 49,963) shows a harvester having an elongated cutter bar and a rotating cutter guard apparatus for guiding the crop into engagement with the cutter bar. U.S. Pat. No. 153,258 shows a harvester having a crop severing finger bar for severing the crop which may be tilted or raised relative to a horizontal plane, and a rotating reel for guiding the crop into engagement with the cutter bar. The reel on this harvester has two wings and the height of the reel relative to the cutter bar is adjustable. U.S. Pat. No. 275,649 also shows a harvester with a two-wing reel which is adjustable in height relative to the cutter bar of the harvester. U.S. Pat. No. 762,168 shows a lawn mower having a rotating two-wing reel for urging tall weeds and grass into engagement with the cutting blades of the mower.

The reels employed in the above patents are merely open frames rotating on a shaft. This reel design is inappropriate for sunflower harvesting since the stalk of the sunflower can be prematurely broken and entangled in the reel. The frames, severing bars and snouts of these devices present both sharp and blunt edges which, upon engaging a sunflower stalk, can prematurely sever it or knock it down so that the seeds fall uncollected. The drive means for the reels and severing bars are inadequately shielded or covered so that stray sunflower stalks or heads can become entangled in the mechanisms. Additionally, the devices described in the above patents were designed to be pulled in operation by draft animals. Thus, the speed of the cutter operation and reel rotation of each device is dependent upon the speed of advancement of the harvester across the ground.

Specifically related to harvester attachments for the harvesting of sunflower crops are U.S. Pat. Nos. 3,844,094 and 4,255,920. U.S. Pat. No. 3,844,094 describes a sunflower gatherer which is installed on a standard combine and has a plurality of spaced apart and parallel troughs extending forwardly from the combine with each trough having a pointed tip. Brushes extend laterally between the troughs and some troughs have lifting bars at their tips which run on the ground to aid in guiding the heads of broken down sunflowers into the combine. A rotatable multi-winged reel, supported by side dividers, extends laterally over the troughs and has a curved shield mounted forwardly of the reel to position the sunflower stalks for severing by an elongated cutter blade under the reel. The wings of the reel are shorter than the wings of an all-crop reel, and thus the reel is mounted lower than a standard reel and cannot be rotated by the standard reel driving mechanism of the combine.

U.S. Pat. No. 4,255,920 also discloses a sunflower harvester attachment for use on a standard combine. This attachment has a plurality of spaced apart and parallel troughs extending forwardly from the combine with pointed tips and brushes between the troughs. The troughs are adjustable angularly relative to the ground and are supported in cantilever fashion by V-shaped braces secured to the underside of each trough. A rotatable multi-winged reel is positioned over the troughs and has a curved shield positioned forwardly of the reel to aid in guiding the sunflower stalks into engagement with a reciprocating knife. This reel also has shorter wings than a standard reel and therefore cannot be rotated by the standard combine reel driving mechanism. Combines are usually provided with height adjustment means so that in operation, the combine cutting assembly together with the sunflower gatherer attachments of these two patents may be set at any desired height above the ground.

Even if the sunflower header attachments of the latter two patents are used, the harvesting of sunflowers is still an inefficient operation. These devices are complex and not easily adjustable. The blunt troughs and dividers with pointed tips break and knock down sunflower stalks so that some seeds cannot be harvested. Multi-winged reels and reel shields prevent the combine operator from viewing the gathering and severing operations of the combine and special attachments are necessary to modify the reel driving mechanism of the combine in order to rotate the smaller reels. The troughs of these devices are not aligned by width with the planted rows of the sunflower crop so that some stalks may be met head-on and broken down by the tip of a trough rather than gently guided into the combine.

The sunflower header attachment of the present invention alleviates many of the problems sunflower producers have faced with prior art sunflower harvesters. It is simple of design and sturdy of construction, thus providing a combine header attachment of optimum sunflower crop gathering ability with minimal cost and moving parts.

SUMMARY OF THE INVENTION

The present invention is a sunflower header attachment for use on a combine in harvesting sunflowers. A standard combine has a reciprocating sickle bar assembly at the front end thereof for severing the crop to be harvested. The sunflower header attachment comprises a plurality of spaced apart and parallel pans secured over the sickle bar assembly at their rearward ends and extending forwardly from the combine. An elongated snout is pivotally mounted at the forward end of each pan to extend forwardly from the pan and pivot angularly relative to the pan. Each snout tapers to a rounded tip and has smooth rounded sides to reduce sunflower stalk breakage and the snouts are pivotally mounted so that, if desired, the tip of the snout can run on the ground to pick and gently guide broken-down sunflowers into the combine. A side divider is mounted at each end of the sickle bar assembly on the front end of the combine and also has smooth rounded sides for gently pushing aside (but not breaking) sunflower stalks which are out of the immediate harvesting path of the combine. A reel is rotatably mounted at its ends on the side dividers to extend over the pans and means for driving the reel are provided so that the reel rotates on a generally horizontal axis for urging the sunflowers into the combine.

Preferably, the reel has only two wings, the axes of which are substantially coplanar, extending from its rotational axis and the wings of the reel are of sufficient size to effectively urge sunflowers into the combine when the reel is mounted on the combine's standard all-crop reel driving mechanism. Each wing is completely covered and has smooth rounded sides and a rounded outer edge so that sunflowers do not become entangled with the reel and the wings while being urged into the combine. The reel also has a plurality of spaced apart fingers at the edge of each wing which are aligned to sweep between adjacent pans as the reel is rotated to eliminate sunflower stalk clogging between the pans. Because the ends of the reel are mounted on the combine's standard reel driving mechanism, the height of the reel relative to the pans and the speed of the reel rotation can be selectively varied by the combine operator during the harvesting operation.

BRIEF DESCRIPTION OF THE DRAWINGS

FIG. 3 is a top view of a portion of the sunflower header attachment of the present invention showing one complete pan and snout assembly.

FIG. 4 is a sectional view taken along line 4—4 of FIG. 3.

FIG. 5 is a sectional view taken along line 5—5 of FIG. 3.

FIG. 6 is an enlarged side view of the snout mounting detail of the present invention.

FIG. 7 is a sectional view taken along line 7—7 of FIG. 6.

FIG. 8 is a sectional view taken along line 8—8 of FIG. 6.

FIG. 9 is an enlarged side view of the pivotal mounting detail for the rearward end of the pan supports of the present invention.

FIG. 10 is a sectional view taken along line 10—10 of FIG. 4.

FIG. 11 is a sectional view taken along line 11—11 of FIG. 3.

DETAILED DESCRIPTION OF THE PREFERRED EMBODIMENTS

Figure 1:
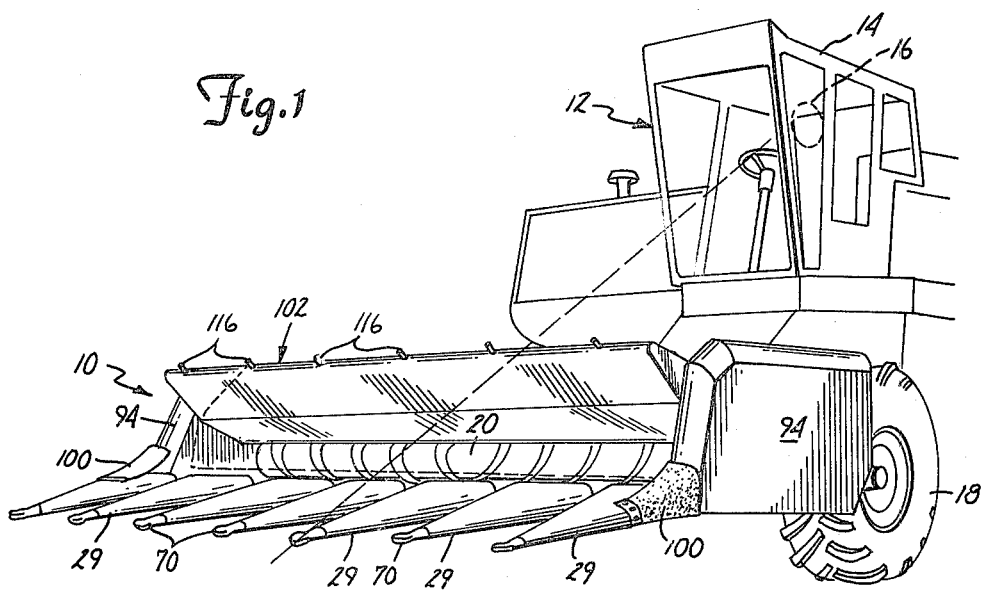
FIG. 1 is a perspective view of a combine harvester with a sunflower header attachment of the present invention attached thereto.
Figure 2:
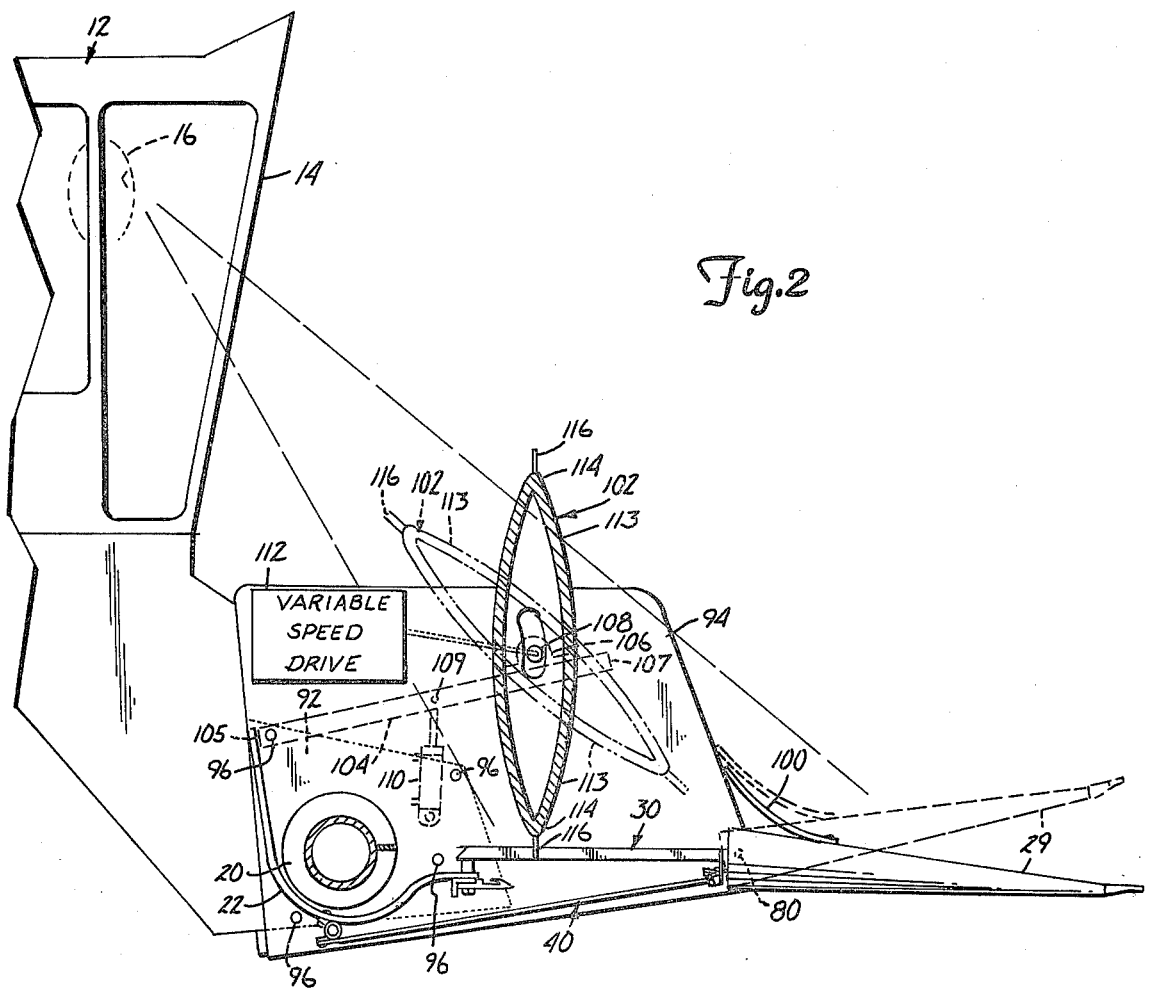
FIG. 2 is a side elevational view of a portion of the combine of FIG. 1 with parts thereof shown in section.

FIG. 1 shows a sunflower header attachment 10 of the present invention mounted on the front end of a standard combine 12. The combine 12 has a cab 14 within which a combine operator 16 controls the operation of the combine 12. The combine 12 is supported on the ground by wheels 18 (only one of which is shown) and has a conventional header assembly across the front end thereof. As shown in FIG. 2, the header assembly includes a collecting augar 20 mounted transversely to the direction of combine advancement over an auger trough 22. The auger 20 is rotated to feed the crop to a crop elevator (not shown) leading to a threshing and concave assembly (not shown) in the combine 12.

A reciprocating sickle bar assembly extends across the forward end of the auger trough 22 and has a plurality of spaced apart knife guards 24 secured to a member 26 (see FIGS. 3 and 4). A plurality of knife sections 28 are secured together for reciprocation and are positioned across the forward end of the auger trough 22 within the knife guards 24. The auger 20 and reciprocating knife sections 28 are driven by standard means (not shown) from the combine 12. Those skilled in the art and familiar with combines will recognize that the features thus far described are conventional and will be found on any standard combine.

The sunflower header attachment 10 of the present invention has a plurality of snouts 29 which extend forwardly from the combine 12. As best shown in FIG. 3, behind the snouts 29 are a plurality of spaced apart and parallel pans 30. Each snout 29 is pivotally mounted on one of the pans 30 to extend forwardly from the pan 30 and pivot relative to the pan 30 and the combine 12.

Each pan 30 is secured at a rearward end over the sickle bar assembly of the combine 12 by fastening means such as bolts 32 and nuts 33, as shown in FIGS. 3 and 4. A spacer 34 is provided to elevate the pan 30 slightly over the sickle bar assembly. Each pan 30 has a generally flat bottom 35 and side walls 36 and 38. In lateral cross section, the side walls 36 and 38 and bottom 35 of the pan 30 define a substantially U-shaped trough, as shown in FIG. 5. The pan also has an end wall 39 at a forward end. This pan configuration is desirable so that if sunflower seeds become disengaged from the sunflower head before reaching the auger trough 22, the seeds will be collected in the pans 30 and will not fall unharvested onto the ground.

Each pan 30 can be individually adjusted so that the forward end of each pan 30 may be raised or lowered relative to the combine 12. Since the snout 29 normally rests on a pivotal connection on the pan 30, and snout 29 is carried up or down whenever the height of the pan 30 is adjusted relative to the combine 12. Standard combines usually have a height adjustment feature for the entire header assembly across the front end of the combine so that with this feature and the sunflower header attachment 10 of the present invention, the position of the snout 29 relative to the ground may be adjusted by three separate means: (1) snout 29 can be adjusted on its pivotal connection to the pan 30; (2) the height of the forward end of each pan 30 (and the snout 29 carried thereon) is adjustable; and (3) the entire sunflower header attachment 10 (and the snouts 29 and the pans 30 carried thereon) can be raised or lowered.

To facilitate adjustment of the height of the pan 30 relative to the combine 12, the forward end of each pan 30 is secured to the combine 12 by a pair of adjustable pan supports 40. As best shown in FIGS. 5 and 6, L-shaped bracket 41 is secured to each corner of the pan 30 at its forward end and extends downwardly from the pan 30 below the pan bottom 35. Each bracket 41 has a side 42 and a side 43. The positioning of bracket 41 in the corner of pan 30 is shown in FIG. 7 as viewed from the top of the pan 30. The adjustable pan support 40 has a first end 44 secured to a lower portion of the side 42 of each bracket 41 and a second end 46 mounted on a bottom side of the auger trough 22, as shown in FIG. 4. Each pan support 40 is extensible and retractable so that the weight of the forward end of each pan 30 is adjustable relative to the combine 12. Of course, as the height of the pan 30 is adjusted, the height of the snout 29 pivotally mounted on the pan 30 is also changed.

The first end 44 of each pan support 40 is selectively secured to the side 42 of the bracket 41 by a fastener such as bolt 48 and nut 50, as best shown in FIG. 8. Each adjustable pan support 40 consists of a first portion 52 which is internally threaded for acceptance of an externally threaded second portion 54. Each pan support 40 is extensible or retractable by turning one portion 52 or 54 while the other portion remains stationary. A lock nut 55 is provided to secure the portions 52 and 54 relative to each other when extended or retracted to the desired position. For ease of adjustment and accessibility, the threaded parts of portions 52 and 54 are preferably located adjacent the first end 44 of pan support 40.

The second end 46 of each pin support 40 is pivotally mounted to the bottom side of the auger trough 22 to allow the pan 30 to pivot relative to the combine 12 when the pan support 40 is extended or retracted. The mounting detail of the second end 46 to the bottom side of the auger trough 22 is shown in FIGS. 9 and 10. The second portion 54 of each pan support 40 is secured to a first collar 56 by suitable fastening means, such as bolt 58 and nut 60. A plurality of second collars 62 are secured to the bottom side of the auger trough 22 by similar suitable fastening means, such as bolts 64 and nuts 66. First collars 56 and second collars 62 encircle an elongated tube 68 in the manner shown in FIG. 9. The tube 68 extends the length of the auger trough 22, but only a portion of which is shown in FIG. 10.

By attaching each pan support 40 to the combine 12 in this manner, the pan support 40 can pivot about tube 68, thus allowing the height of the forward end of the pan 30 to be adjusted. As the pan supports 40 for each pan 30 are extended or retracted, the pan 30 flexes at its rearward end to compensate for the change in height at its forward end. Although the rearward end of each pan 30 is bolted to the combine 12, each pan 30 is flexible enough to allow for a limited degree of adjustment.

As stated, an elongated snout 29 is pivotally mounted on the forward end of each pan 30. Each snout 29 is tapered to a tip at a front end 70 with the tip being rounded as shown in FIG. 3 so that sunflower stalks engaged by the front end 70 of the snout 29 of the advancing combine 12 will not be speared or knocked down. All sides of the snout 29 have smooth completely covered surfaces and edges of the snout 29 are rounded so that the sunflower stalks being gathered by the sunflower header attachment 10 do not come in contact with any sharp edges or become entangled with the snouts 29. FIG. 11 best shows the smooth sides and rounded edges of the snout 29.

Each snout 29 is widest at a rear end where the snout 29 is pivotally secured to the forward end of the pan 30. A pivot mount housing 76 is secured in the snout 29 at its rear end. As shown in FIG. 7, a rearwardly extending portion 78 at each side of the housing 76 slidably engages the side 42 of one of the L-shaped brackets 41 at each forward corner of the pan 30 for closely spaced parallel positioning. Each bracket 41 has a pivot pin aperture in side 42 with the apertures of the brackets 41 on each pan 30 being aligned on a lateral axis across the forward end of the pan 30. The portions 78 of each housing 76 have holes aligned with the bracket apertures so that suitable fastening means, such as pivot pins 80, provide pivotal connections between each snout 29 and pan 30. With each snout 29 attached to its respective pan 30 in this fashion, the snout 29 pivots about the axis defined by the pivot pins 80 on its forward end of the pan 30, as illustrated in FIG. 2.

A stop means is provided on the lower end of each bracket 41 to limit the extent of the downward pivot of each snout 29. As shown in FIGS. 6 and 8, a threaded stop bar 84 passes through a nut 86 welded to the side 43 of the bracket 41 and an aperture 88 in side 43 to engage an edge 90 of the rearwardly extending portion 78. By screwing the threaded stop rod 84 in or out of the bracket 41, the extent of the downward pivot of snout 29 about the axis defined by pivot pins 80 can be changed. There is no stop or limitation on the extent of upward pivot of the snout 29 other than the construction of the parts. Thus, when harvesting with a standard combine 12, the entire header assembly of the combine 12 can be lowered near the ground to allow each snout 29 to ride on the ground and follow the contour of the ground in collecting downed sunflower heads.

Another standard feature on most conventional combine header assemblies is an auger side plate 92, which is mounted at each end of the auger 20 as shown in FIG. 2. The sunflower header attachment 10 of the present invention has a pair of side dividers 94 secured to the combine 12 and auger side plate 92 by fasteners 96 (see FIGS. 1 and 2). Each side divider 94 has smooth sides and rounded edges on an outer side for gently pushing aside (but not breaking) sunflower stalks which are out of the immediate path of the advancing combine 12. An inner side of each side divider 94 also has smooth sides and rounded edges to prevent sunflower parts from becoming entangled in any of the combine header assembly drive mechanisms.

Each side divider 94 is mounted next to one of the snout 29 and pan 30 assemblies at each end of the auger trough 22. To further prevent damage to sunflowers not in the path of the advancing combine 12, a corner shield 100 is mounted adjacent a forward end of each side divider 94 to form a smooth transitive surface from the adjacent snout 29 to the side divider 94. The corner shield 100 is mounted on the snout 29 as shown in FIGS. 1 and 2 to allow the snout 29 to pivot and provide a smooth surface in all possible pivot positions.

A reel 102 is rotatably mounted at its ends laterally over the pans 30 for rotation on a generally horizontal axis. Each end of the reel 102 is mounted on the combine 12 in a similar fashion, as shown in FIG. 2. The reel 102 is supported by a reel mounting arm 104, which has a first end 105 pivotally mounted to the combine 12 adjacent each of the auger side plates 92. A bearing means 106 is mounted on the reel mounting arm 104 adjacent a second end 107. A shaft 108 extends from a center of each end of the reel 102 and is mounted in the bearing means 106 so that the reel 102 rotates freely about its shaft 108 in the bearing means 106. A hydraulic cylinder 110 is pivotally mounted at an end 109 adjacent the midpoint of the reel mounting arm 104. Another end 111 of the hydraulic cylinder 110 is pivotally mounted to the combine 12, as shown in FIG. 2. The hydraulic cylinder 110 is acutated (to extend or retract) by the combine operator 16 by controls (not shown) located in the cab 14 of the combine 12. The reel 102 is mounted in this manner at each of its ends adjacent the side dividers 94 and the hydraulic cylinders 110 operate simultaneously when actuated by the combine operator 16 to raise or lower the reel 102.

When the cylinders 110 are extended, the reel mounting arms 104 pivot upwardly raising the reel 102 relative to the pans 30. To lower the reel 102 the cylinders 110 are retracted. The reel 102 is rotatably driven through its shaft 108 from the combine 12 by a standard variable speed drive means 112 (usually a belt drive mechanism). In fact, the reel mounting arm 104, hydraulic cylinder assemblies 110, and reel speed drive 112 are standard features found on any conventional combine.

Unlike many reels, the reel 102 of the present invention has only two wings 113. As shown, the axes of the wings 113 are substantially coplanar and each wing 113 is completely covered with smooth rounded sides and has a rounded outer edge 114. The entire reel 102 is smooth and rounded in this manner so that when it rotates to urge sunflower stalks into the combine 12, the stalks will not become entangled in or broken off by the reel 102. A plurality of spaced apart fingers 116 extend outwardly at the outer edge 114 of each wing 113 of the reel 102. Each finger 116 is positioned (as shown in FIG. 1) to sweep the gap between adjacent snouts 29 and pans 30 as the reel 102 is rotated. The fingers 116 clear the narrow gap between the pans 30 twice during each rotation of the reel 102 to eliminate stalk clogging between the pans 30 and further urge the sunflower stalks and heads into the sickle bar assembly and collecting auger 20.

A further advantage of having a two-wing reel 102 rather than the multi-winged reels of the prior sunflower headers is that the combine operator 16 has an unobstructed view of the gathering and severing operations of the sunflower header attachment 10 during a significant portion of each rotation of the reel 102. When the reel 102 rotates to the position shown in phantom in FIG. 2, the combine operator 16 has an unobstructed view of the gathering operation of the snouts 29 of the sunflower header attachment 10. In addition, the operator 16 can also view the severing operation of the sickle bar assembly as the reel 102 rotates.

If the reel 102 had more than two wings 113, the combine operator's view of the operation of the sunflower header attachment 10 would be significantly obstructed. In the prior art, attempts were made to diminish this obstruction to view by reducing the size of the wings of the reel and mounting the reel closer to the pans. However, this required additional mounting and driving means for the reel since the smaller reel was not close enough to the pans and sickle bar assembly to be effective if mounted on the standard combine reel mounting means.

While the exact dimensions are not critical, by way of example the reel 102 of the present invention is at least three and one-half feet across (from the outer edge 114 of one wing 113 to the outer edge 114 of the other wing 113), which is approximately the same dimension as a standard all-crop reel. With the two-winged reel 102 of this size, the standard reel mounting means (reel mounting arm 104) of the combine 12 can be used for supporting the reel 102. Therefore, the position of the reel 102 relative to the pans 30 may be varied by actuation of the hydraulic cylinders 110 by the combine operator 16 using standard reel height controls in the cab 14 of the combine 12. Additionally, the speed of rotation of the reel 102 may be controlled using the standard reel speed drive means 112 of the combine 12 by the combine operator 16 from the combine cab 14.

The present invention provides a sunflower header attachment which can be secured on a standard combine for harvesting sunflowers. The sunflower header attachment has a plurality of smooth rounded snouts pivotally mounted on pans to extend forwardly from the combine for guiding sunflowers into the combine. The height of each pan is also adjustable so that the snouts can be placed in a variety of sunflower collection positions, as desired. A smooth sided, two-winged reel is positioned to rotate over the pans to further urge sunflowers into the combine. The two-winged reel of the present invention allows the combine operator to view a significant portion of the gathering and severing operations of the combine while the reel is rotating.

Although the present invention has been described with reference to preferred embodiments, workers skilled in the art will recognize that changes may be made in form and detail without departing from the spirit and scope of the invention.

What is claimed is:

1. A sunflower header device for attachment on a combine having a reciprocating sickle bar assembly at a front end thereof and an auger trough positioned rearwardly of the sickle bar assembly, the device comprising:
   a plurality of spaced apart and parallel pans, each pan having a forward end and a rearward end and being secured at its rearward end to the sickle bar assembly to extend forwardly from the combine;
   a plurality of brackets secured to each pan at its forward end;
   a plurality of adjustable pan supports, each pan support having a first end and a second end, the first end of each pan support being selectively secured to one of the brackets, the second end of each pan support being pivotally secured to the auger trough, and the pan supports being extensible and retractable so that the height of the forward end of each pan is adjustable relative to the combine;
   a plurality of elongated snouts, each snout having a front end and a rear end, each snout being pivotally mounted at its rear end on the forward end of each pan, and each snout having a plurality of opposing similar top and bottom smooth sides joined by rounded edges, said edges and sides being tapered to form a rounded tip at the front end of the snout;
   a side divider mounted at each end of the sickle bar assembly on the front end of the combine, and each divider having smooth sides and rounded edges;
   a reel rotatably mounted at its ends adjacent the side dividers to extend over the pans and rotate on a generally horizontal axis for urging sunflowers into the combine; and
   means for driving the reel.

2. The device of claim 1 and further comprising:
   a first collar secured at the second end of each pan support;
   a plurality of second collars secured under the auger trough;
   a tube extending through the first and second collars providing a pivotal connection for the pan supports to the auger trough.

* * * * *